Dec. 25, 1951 F. E. BLOUNT 2,580,069

DIAL PULSE RECEIVING CIRCUIT

Filed July 8, 1949 3 Sheets-Sheet 1

INVENTOR
F. E. BLOUNT

BY C. Mattice

ATTORNEY

Dec. 25, 1951 F. E. BLOUNT 2,580,069

DIAL PULSE RECEIVING CIRCUIT

Filed July 8, 1949 3 Sheets-Sheet 2

INVENTOR
F. E. BLOUNT
BY C. Mattice
ATTORNEY

Dec. 25, 1951 F. E. BLOUNT 2,580,069

DIAL PULSE RECEIVING CIRCUIT

Filed July 8, 1949 3 Sheets-Sheet 3

INVENTOR
F. E. BLOUNT
BY C. Mattice
ATTORNEY

Patented Dec. 25, 1951 2,580,069

UNITED STATES PATENT OFFICE 2,580,069

DIAL PULSE RECEIVING CIRCUIT

Frank E. Blount, Cedar Grove, N. J., assignor to Bell Telephone Laboratories, Incorporated, New York, N. Y., a corporation of New York Application July 8, 1949, Serial No. 103,689

8 Claims. (Cl. 179—175.2)

This invention relates to telephone systems and has for its object to facilitate the observation of dial pulse reception in dial telephone systems.

In observing dial pulse reception it is essential that the observing equipment does not interfere with the service equipment and for that reason it has previously been suggested that vacuum tube means be used for such observations. But because of the sensitivity of such vacuum tube observing means, there is a tendency to register transient pulses caused by other circuit conditions.

In accordance with the present invention means is provided for rendering a vacuum tube pulse receiver unresponsive to pulses of less than a minimum length.

Specifically, an additional vacuum tube, arranged as a multivibrator blocks the output of the pulse receiver for a fixed minimum time following the start of a dial pulse.

In addition, means is provided to rapidly restore the multivibrator so that it may block out a plurality of short pulses.

Furthermore, since the observing equipment of the present invention is operated without a local ground connection, special means is provided to adjust the bias voltage supply to the observing equipment in accordance with the changes in the grounded voltage supply employed by the service equipment.

These and other features of the invention will be more apparent from a consideration of the following description read in connection with the attached drawing in which.

Figure 2:
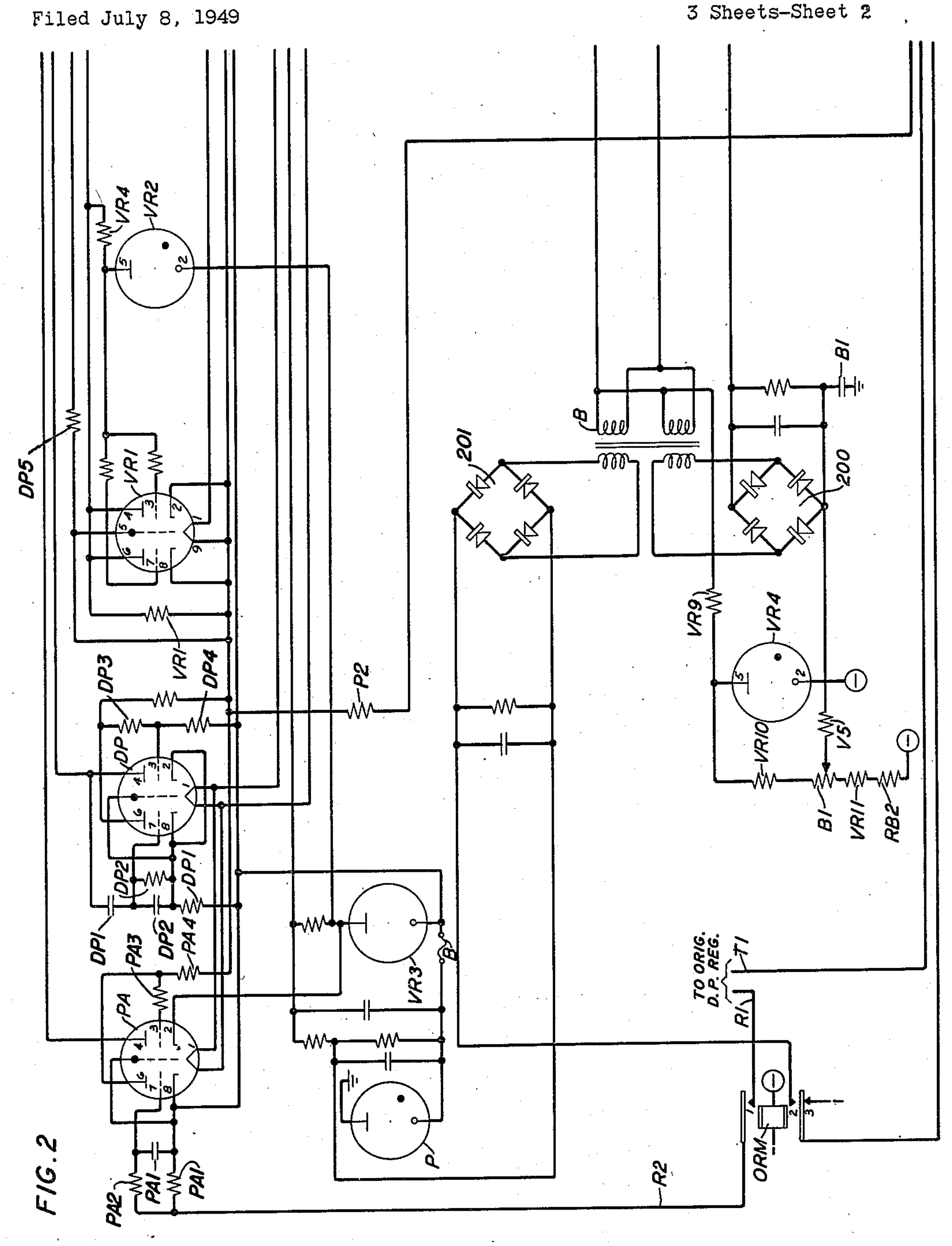
Figs. 2 and 3 show detailed circuits including the voltage control arrangement.
Figure 3:
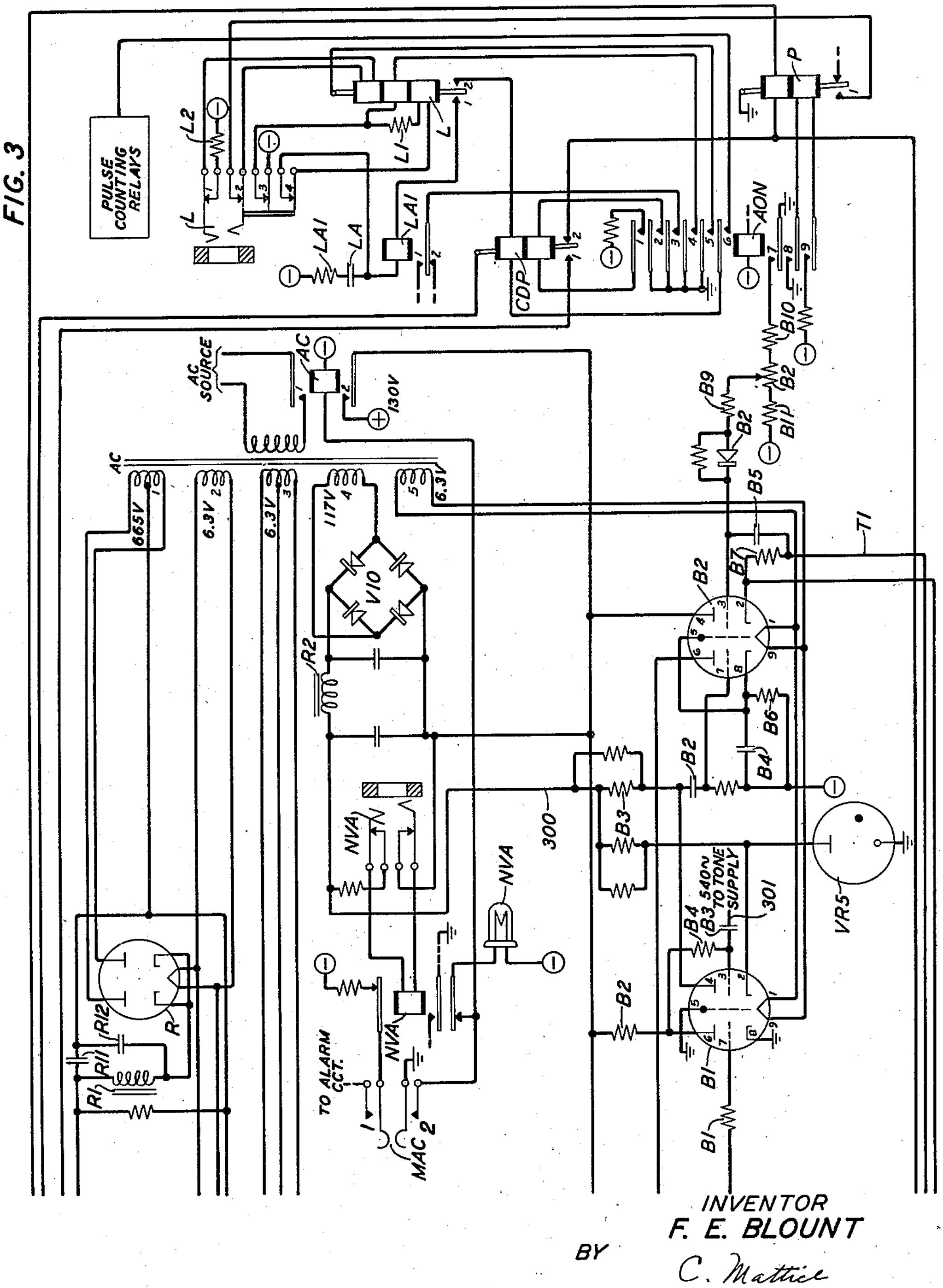

This pulse receiving arrangement, particularly as shown in Figs. 2 and 3 forms a part of the register monitoring system disclosed and claimed in Patent 2,508,053, granted to J. W. Dehn et al., May 16, 1950.

Figure 1:
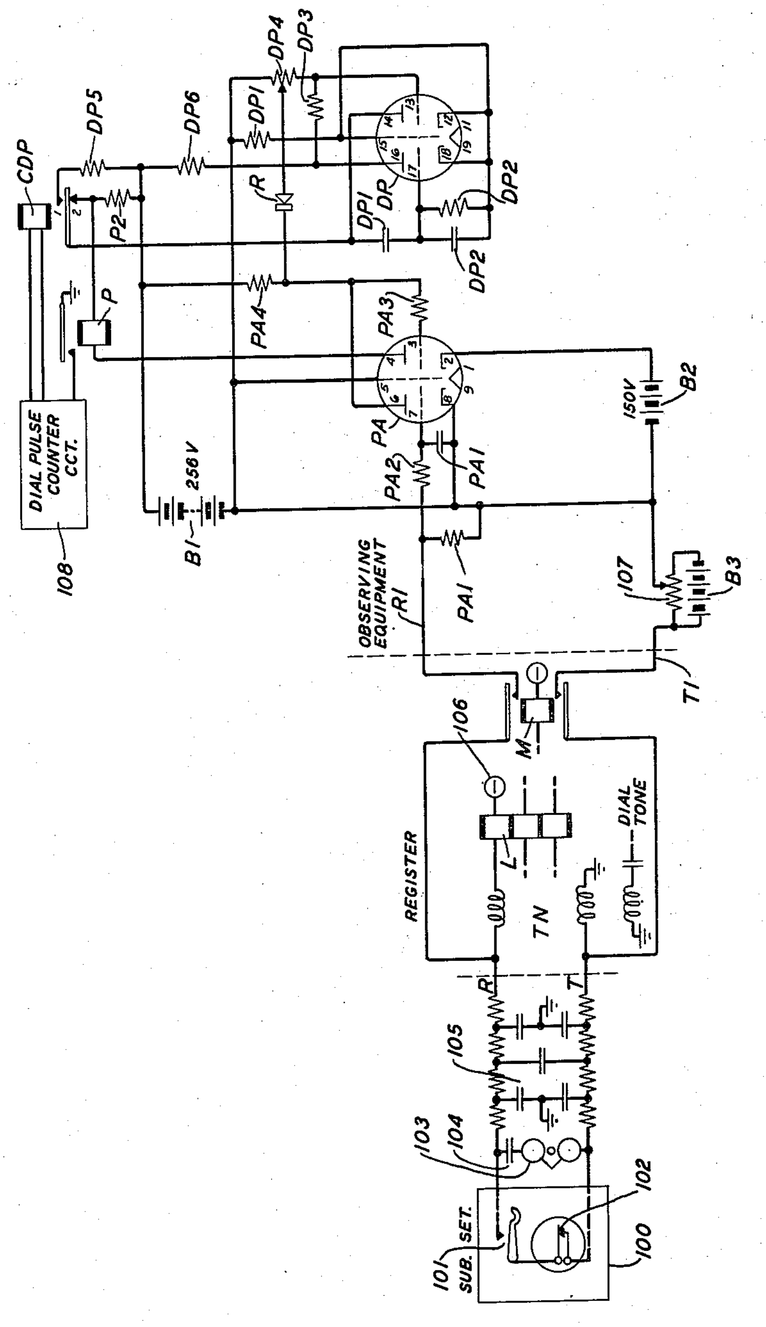
Fig. 1 shows the pulse receiver in simplified form.

Referring first to Fig. 1, a subscriber's substation 100 is indicated, showing the hook switch 101, dial 102 and ringer 103 connected in series with condenser 104 across the subscriber's line, the distributed capacity and resistance of which is represented by the network 105. When the subscriber initiates a call by closing hookswitch 101, his substation 100 is connected by means well known in the art to a register, where the ring conductor R is extended through the upper winding of tone coil TN and the upper winding of pulsing relay L to office battery 106. The tip conductor T is extended through the middle winding of tone coil TN to ground. Dial tone flowing in the lower winding of tone coil TN is transmitted in the well-known manner to inform the subscriber that he may operate his dial. If the call is to be observed, or monitored, relay M is operated when the line is connected to the register and conductors R and T are extended to conductors R1 and T1, respectively, leading to the observing equipment.

The voltage across conductors R and T and therefore across conductors R1 and T1, with the line loop closed before dialing starts, is less than the potential of the office battery by the voltage drop due to the current flowing through the upper winding of relay L and the upper and middle windings of coil TN. In a typical case this voltage drop might be in the order of 15 volts. When the dial contacts are opened, the voltage will rise to that of the office battery which is approximately 50 volts. The insertion of an inductance in the line or the momentary opening of the line by a chattering contact will also allow the voltage to rise.

The pulse amplifier tube PA consists of two independent sections, one section including cathode 8, grid 7 and plate 6, the other section including cathode 2, grid 3 and plate 4. The heating element connecting terminals 1 and 9 of the tube as well as the similar element of tube DP may be heated by means of any suitable circuit arrangement, this circuit being closed well in advance of the first observation to insure that the tubes will be in operative condition when observations start. Grid 7 is connected to cathode 8 through high resistances PA2 and PA1.

When no observation is being made, and therefore no external voltage is applied to grid 7, the internal voltage drop within this section of the tube is low and the voltage at plate 6 will be low. Since plate 6 is connected through high resistance PA3 to grid 3 of the second section, grid 3 will also be at a low potential, which will be lower, that is, more negative than cathode 2, since cathode 2 is connected to the positive pole of battery B2, the negative pole of which is connected to cathode 8. Therefore, no current will flow in the circuit including cathode 2, plate 4 and the winding of relay P.

When relay M is operated to connect the observing equipment with the line to be observed, the line circuit will already be closed, and grid 7 is made positive with respect to cathode 8, since the bias voltage B3 is greater than and of opposite polarity to the potential across conductors T and R. Therefore the conditions within the amplifier are not changed when connection is made to the line, except that slightly more current flows between cathode 8 and plate 6.

When the subscriber starts to dial, the opening of dial contact 102, increasing the voltage across conductors R1 and T1, causes grid 7 to become negative with respect to cathode 8. The bias voltage B3, is adjusted, by means of the adjustable potentiometer 107, to a value which allows grid 7 to become sufficiently negative in response to the opening of the dial contact so that the voltage on plate 6 and grid 3 is increased to a value where sufficient current will flow to operate relay P, the circuit for relay P extending from plate 4 through resistance P2 to battery B1. However, relay P does not operate on the initial flow of current, due to the blocking action of tube DP.

Tube DP also consists of two independent sections, one including cathode 18, grid 17 and plate 16 and the other including cathode 12, grid 13 and plate 14. Grid 17 is connected to cathode 18 through resistance DP2 and current normally flows between cathode 18 and plate 16 over a circuit including resistance DP6, battery B1 and resistance DP1. Plate 16 of the first section is connected through resistance DP3 to grid 13 of the second section. Condenser DP1, which is connected between grid 17 and plate 14 is normally charged to the voltage of battery B1.

The initial change in voltage on plate 4 is transmitted through relay P and over contact 2 of relay CDP to condenser DP1 causing that condenser to discharge and causing grid 17 to become negative with respect to cathode 18. This reduces the current flowing in the first section of tube DP, reducing the voltage drop across resistance DP6 and thereby causing plate 16 to become more positive, and in turn making grid 13 positive with respect to cathode 12. As a result, current flows in a circuit from battery B1, resistance DP1, cathode 12, plate 14, contact 2 of relay CDP, resistance P2 back to battery B1. It may be noted that this circuit includes resistance P2 which is also included in the circuit of relay P. The voltage at plate 14 will be low enough to prevent sufficient current from flowing through the winding of relay P to permit that relay to operate.

Condenser DP1 starts to discharge through resistance DP2, the voltage on grid 17 becoming less negative with respect to cathode 18 as the condenser becomes discharged. When this difference in voltage reaches the proper value, current will start to flow between cathode 18 and plate 16, changing the voltage on plate 16 and consequently on grid 13. The change in voltage on grid 13 reduces the current flowing between cathode 12 and plate 14. The values of condenser DP1 and resistance DP2 are selected to obtain a definite period for the cycle of events resulting in this change in voltage, at the end of which sufficient current flows through the winding of relay P to operate that relay, provided that the pulse voltage is still present on grid 7.

Relay P, when operated, causes auxiliary relays in the dial pulse counter 108 to operate, in turn operating relay CDP. Relay CDP at its contact 2 disconnects plate 14 and condenser DP1 from the winding of relay P, so that a momentary subsequent change in voltage, occurring during a pulse of sufficient length, can not cause the multivibrator circuit to reoperate and thereby cause relay P to release. At its contact 1, relay CDP connects condenser DP1 to battery B1 through low resistance DP5 to recharge.

At the end of the dial pulse, the potential across conductors R1 and T1 returns to the lower value, grid 7 is returned to its more positive condition and current ceases to flow through the winding of relay P so that relay P releases. The release of relay P is followed by the release of relay CDP and the circuit is ready for the next pulse.

It is evident from the foregoing that relay P will not be operated in response to transient pulses of less duration than the delay period provided by tube DP.

The restoral time of the multivibrator circuit is much shorter than the operated period, measured by the discharge of condenser DP1 through resistance DP2, since, in addition to the current flow through resistance DP2 there will also be current flow through grid 17 for recharging condenser DP1.

If rectifier R were not present, tube DP would complete its time cycle, regardless of whether or not the pulse which initiates it continues for the same length of time and therefore might not be ready to block out a second short pulse which closely follows the first short pulse. However, by connecting rectifier R between plate 6 of tube PA and the proper point on resistance DP4 which is connected to grid 13 of tube DP, the multivibrator circuit may be restored to normal at the end of a short pulse. With rectifier R connected, as shown, the reduction in voltage at plate 6 of tube PA, which occurs at the end of a pulse, will reduce the voltage on grid 13 of tube DP to a value where the multivibrator circuit will be restored to normal. Changes in voltage which occur during the normal operation of the multivibrator circuit will not affect the voltage at plate 6 of tube PA, owing to the directional properties of the rectifier R.

Referring now to Figs. 2 and 3, these figures show an arrangement for using the pulse observing circuit of Fig. 1 in an automatic observing or monitoring system of the type disclosed and claimed in the above-identified patent to J. W. Dehn et al., and are substantially copies of Figs. 12 and 19 of that application. The elements of Figs. 2 and 3 corresponding to elements of Fig. 1 have been given the same designations.

The circuits of Figs. 2 and 3 embody means for supplying the necessary direct-current voltages for operating the pulse receiving tubes from an ungrounded source of alternating current and for automatically varying the bias on the pulse amplifier tube PA in accordance with the variations of the office battery voltage.

To prepare the monitor for operation key MAC is first operated. Key MAC closes a circuit from battery through the winding of relay AC to ground over the contact 2 of key MAC operating relay AC, which closes the energizing circuit for the primary winding of transformer AC, thereby supplying current through the secondary windings of transformer AC to the heating elements of various vacuum tubes, the use of which will appear hereinafter, to full-wave rectifier tube R and to full-wave dry rectifier V10. Relay NVA which is connected to rectifier V10 operates as an indication that the automatic monitor is ready for operation. If relay NVA fails to operate, or releases, following the operation of key MAC, lamp NVA lights and battery connected over contact 1 of relay NVA and contact 1 of key MAC causes a no-voltage alarm to sound.

When the monitor is ready to function, relay AON is operated closing biasing circuits for polarized relays CDP, L and P. In addition, when the monitor is set to observe on originating registers and the marker has operated the relay M in a particular register, relay ORM is operated, extending conductor R1, which is extended in multiple to all originating registers, to conductor R2 leading to the pulse amplifier tube PA. When the marker causes the connection of the calling subscriber's line to the originating register, the operation of relay M, individual to that register, connects conductors R1 and T1 to the calling line, as described in connection with Fig. 1.

Two ungrounded sources of direct-current power, in addition to alternating current for the heaters of the vacuum tubes, are required. An ungrounded source of direct-current power is required owing to the operation of the amplifier circuit at a potential above ground determined by the conditions in the monitored circuit. The second ungrounded direct-current supply supplements the 130-volt office battery potential. The amplifier is sensitive to small changes in direct-current voltage, hence it is necessary to regulate the rectified alternating current supplied to it, which may vary from the nominal value by + or −10 per cent. A connection is made from the alternating-current supply to the transformer tap corresponding to the nominal supply voltage.

The voltage supply for tubes PA and DP is obtained through rectifier tube R and voltage control tube VR1. Vacuum tube R rectifies the alternating current and the filter comprising retard coil R1 and condensers R11 and R12 reduces the ripple in the direct-current voltage supply to vacuum tubes PA and DP. The direct-current voltage at the output of the filter fluctuates as the alternating-current supply voltage fluctuates. The gas-filled voltage regulator tubes VR2 and VR3 and a 10,000-ohm resistance VR4 are connected in series across the direct-current supply at the output of the filter. The current through the tubes and resistance will vary as the voltage fluctuates. The voltage drop across the voltage regulator tubes VR2 and VR3 will remain substantially constant however owing to the characteristics of the tubes. This property is also used for controlling the voltage of other parts of the circuit. The load current is passed through a circuit consisting of vacuum tube VR1 and a 33,000-ohm resistor VR1 in parallel.

The grids (elements 3 and 7) of tube VR1 are connected to terminal 5 of tube VR2. So long as tube VR1 operates between saturation and cut-off, a minimum voltage difference will be maintained between the grids and cathodes of tube VR1. For instance, if the input direct-current voltage should go up, the direct-current potential on the load would tend to go up. But since this would cause the grids to become more negative with respect to their cathodes, the current flowing through tube VR1 is reduced and a greater proportion of the load current will flow through resistance VR1 which is in parallel with tube VR1. The cathode voltage will therefore tend to remain at approximately the original value or very nearly that obtaining across the voltage regulator tubes VR2 and VR3.

The gas-filled tube P and fuse B are provided in order to prevent a dangerously high voltage from being connected to leads external to this circuit in the event that the high voltage section, direct current or alternating current, of the amplifier power supply became grounded. In operation, tube P would fire when the voltage to ground exceeded approximately 180 volts. The resulting current through fuse B would cause it to operate and open the circuit.

The purpose of the bias control circuit including tubes B1 and B2 is to reproduce, in the ungrounded pulse amplifier circuit, changes in the central office battery voltage which is grounded. This control is required by the dial pulse amplifier since the circuits from which it is operated are connected to the central office battery and are therefore subject to variations in this supply voltage.

No attempt has been made to exactly reproduce the office battery voltage at the output of the bias control circuit. The essential requirement is to reproduce the change in voltage and supplement the output with a constant voltage of a value which would meet the requirements of the amplifier.

The method used in this circuit to obtain a voltage supply which varies in accordance with variations in a reference voltage is that of matching a controlled voltage against the uncontrolled reference voltage. The control is effective when differences in the two voltages occur. The control acts to reduce this difference by increasing or decreasing the controlled voltage as is required. The control voltage used in the balancing circuit has an exact counterpart which is used to supply the biasing voltage for the amplifier. Neither of these voltage supplies is grounded.

Plate supply for the bias control circuits is obtained from the office 130-volt supply and a booster voltage for plate 4 of vacuum tube B1 from rectified and filtered alternating-current power. Grid bias for grid 3 of vacuum tube B2 is obtained from the office 48-volt battery through a voltage divider.

The ungrounded biasing potential for the amplifier PA is obtained from rectified alternating current. The magnitude of the alternating current is controlled through an amplifier by a direct-current voltage which is a fixed amount below (less negative than) the office battery potential and changes in potential as the office battery potential changes. A change in the office battery voltage will be reflected by a change of the same magnitude in the direct-current bias voltage.

In this bias control circuit, the gas-filled voltage regulator tube VR4 with series resistor VR9 is connected between the 130-volt office supply and the negative reference voltage which is the same as that supplied to the dial pulsing circuit by the register. Resistance VR9 limits the current which will flow and tube VR4 maintains a virtually constant voltage drop across its terminals. A voltage divider circuit is connected across terminals 2 and 5 of tube VR4. This consists of resistances VR10, VR11 and RB2 and potentiometer B1 connected in series. The slider of the potentiometer is connected through a filter circuit, a rectifier circuit and a resistance B1 to grid 7 of vacuum tube B1. Resistance V5 and condenser B1 serve as a filter circuit for preventing low alternating-current voltages, superimposed on the office battery supply, from affecting the operation of the bias control circuit. The rectifier 200 is a duplicate of the rectifier 201 supplying the bias voltage for the amplifier. The alternating current for the two rectifiers is obtained from duplicate windings on transformer B. The rectifier's function is to introduce a voltage which is equal to the voltage difference between the reference voltage at the potentiometer slider and the voltage at grid 7 of tube B1. Both voltages are with respect to the reference ground. Means is provided for shunting the rectifier 201 with the proper resistance to offset differences in the two rectifiers and make the change in output the same for both with a given change in the input alternating-current voltage. Variations in the bias voltage of grid 7 of tube B1 cause the alternating current from the tone supply input to the rectifier to vary. Hence, the error voltage will be the increase or decrease in the grid 7 bias required to change the rectified alternating-current output by an amount equal to the change in reference voltage.

Cathode 2 of tube B1 is connected to ground through gas-filled voltage regulator tube VR5. To keep the tube VR5 operating under optimum regulating conditions an additional connection is made from it to the 230-volt supply conductor 300. The voltage at cathode 2 of tube B1 is approximately the same as at plate 6 of tube B1. The plate 6 and grid 3 of vacuum tube B1 are connected through resistance B4 to form a direct-current amplifier. A 540-cycle alternating-current voltage obtained on conductor 301 from the tone supply circuit is connected through the condenser B3 to grid 3 of tube B1. Plate 6 of tube B1 is connected to +130 volts through resistance B2. Plate 4 of tube B1 is connected to +230 volts on conductor 300 through resistance B3. Plate 4 of tube B1 is connected through condenser B2 to grid 7 of tube B2. Cathode 8 of tube B2 is connected to —48-volt office battery through resistance B6 and condenser B4 in parallel. Plate 6 of tube B2 is connected through the right windings in parallel of the transformer B to the office +130-volt supply.

To illustrate the operation of the circuit let us assume that the office battery voltage increases by 5 volts in a matter of three or four seconds. A change in amplifier input is required in order to change the rectified alternating-current output voltage. Grid 7 of tube B1 will become more negative as a result of the change in battery voltage. Less current will therefore flow in the plate-cathode circuit of that tube. The voltage drop across resistance B2 will also be reduced thus making grid 3 more positive. Making grid 3 more positive increases the effect the alternating-current voltage superimposed on the grid has in causing the plate current to fluctuate. The fluctuations in voltage are transmitted to the third stage, left half of tube B2, where it is amplified still further. The increase in rectified alternating current from the full-wave rectifier 200 balances out the increase in the reference voltage except for the small change in the bias on grid 7 tube B1 required to maintain the increased output. The adjustment in output will be made as rapidly as the input changes. If the voltage on the office battery supply leads was 47 voltages initially, and the voltage across the rectifier 200 was 32 volts, the final voltages would be 47+5 or 52 volts for the battery supply circuit and 32+5—.1=36.9 volts for the rectifier output.

The pulse amplifier tube PA and the multivibrator tube DP function in the manner described in connection with Fig. 1, to operate relay P in response to each pulse from the subscriber's dial. Relay P in operating, closes a circuit over its contact 1, contact 2 of jack L, upper winding of relay L, contact 1 of jack 1, resistance L2 to battery. Relay L is a condenser timed relay, energized due to the operation of relay AON by a circuit extending from battery over contact 3 of jack L, middle winding of relay L, to ground at contact 4 of relay AON. This circuit energizes relay L in a direction to cause it to close its contact 1.

When relay P closes the circuit above traced through the upper winding of relay L, the latter relay closes its contact 2, completing a circuit from battery supplied through a relay in the pulse counting relay circuit, contact 6 of relay AON, upper winding of relay CDP, contact 2 of relay L to ground at contact 5 of relay AON. Relay CDP performs the functions described in connection with Fig. 1, while the relay in the pulse counting relay circuit, controls that circuit to count the pulse.

The voltage change which occurs across the tip and ring of the line during pulsing is also dependent on the resistance in the loop, the greatest change occurring with short loops. This permits a reduction in the amplifier bias to be made when the connected loop is of low resistance. Such a reduction is required under some short loop conditions in order to prevent splitting dial pulses. Corrections in bias voltage with changes in pulsing loop are controlled by the tube B2 (elements 2, 3 and 4) and the associated circuit. Tube B2 in turn is controlled by the voltage drop across the tone coil in the subscriber's register as it appears on conductor T1. This voltage will vary in inverse ratio to the resistance of the connected loop. That is, with a short loop the voltage will be high and with a long loop it will be low. When the loop is opened during pulsing this voltage drops to zero. It is during this period when the voltage is zero that compensation is required, hence a memory circuit is used for retaining a condition which is based on the normal condition. The memory circuit consists of an 8-microfarad condenser B5, which is charged to the voltage obtaining across the tone coil winding in the period before pulsing starts. The charging circuit is non-linear, resistance not the same in the two directions of conduction owing to the use of rectifier B2 in this circuit, therefore, the charge will be built up rapidly on the condenser but will be dissipated at a reduced rate. Grid 3 of tube B2 is normally biased in such a way that no current will flow in the cathode 2, plate 4 circuit until the potential on the memory condenser exceeds this value. This bias voltage is obtained from the office battery using a voltage divider. The divider consists of resistances B10 and B11 in series with potentiometer B2. Any increase in voltage beyond this value will be counter-balanced by the voltage drop across resistance B7 in the cathode 2, plate 4 circuit of tube B2. The cathode resistor B7 is also in the input circuit for the amplifier hence the potential drop across it will alter the effective bias of the amplifier.

What is claimed is:

1. In a dial pulse receiving circuit, a vacuum tube having an input circuit and an output circuit and responsive to voltage variations caused by dial pulses in said input circuit, pulse registering means in said output circuit, and means to block said output circuit for a measured interval to prevent the operation of said registering means in response to pulses of substandard length.

2. In a dial pulse receiving circuit, a first vacuum tube having an input circuit and an output circuit and responsive to voltage variations caused by dial pulses in said input circuit, pulse registering means in said output circuit, and means to block said output circuit for a measured interval to prevent the operation of said registering means in response to pulses of substandard length, comprising a second vacuum tube and circuits for causing said second tube to act as a multivibrator.

3. In a dial pulse receiving circuit, a first vacuum tube having an input circuit and an output circuit and responsive to voltage variations caused by dial pulses in said input circuit, pulse registering means in said output circuit, a second vacuum tube, circuits for causing said second tube to act as a multivibrator, and means under the control of said second tube to prevent the operation of said pulse registering means for a predetermined interval.

4. In a dial pulse receiving circuit, a first vacuum tube having an input circuit and an output circuit and responsive to voltage variations caused by dial pulses in said input circuit, pulse registering means in said output circuit, a second vacuum tube having an input circuit and an output circuit, circuits for causing said second tube to act as a multivibrator, means for placing the input circuit of said second tube under the control of the output circuit of said first tube and means in the output circuit of said second tube to prevent the operation of said pulse registering means for a predetermined interval.

5. In a dial pulse receiving circuit, a first vacuum tube having an input circuit and an output circuit and responsive to voltage variations caused by dial pulses in said input circuit, pulse registering means in said output circuit, a second vacuum tube having an input circuit and an output circuit, circuits for causing said second tube to act as a multivibrator, a normally charged condenser connecting the output circuit of said first tube with the input circuit of said second tube, said condenser discharged by the response of said first tube to a dial pulse, the output circuit of said second tube responsive to the discharge of said condenser to prevent the operation of said pulse registering means for a predetermined interval.

6. In a dial pulse receiving circuit, a first vacuum tube having an input circuit and an output circuit and responsive to voltage variations caused by dial pulses in said input circuit, pulse registering means in said output circuit, a second vacuum tube having an input circuit and an output circuit, circuits for causing said second tube to act as a multivibrator, a normally charged condenser connecting the output circuit of said first tube with the input circuit of said second tube, said condenser discharged by the response of said first tube to a dial pulse, the output circuit of said second tube responsive to the discharge of said condenser to prevent the operation of said pulse registering means for a predetermined interval, and means under the control of said pulse registering means to recharge said condenser.

7. In a dial pulse receiving circuit, a first vacuum tube having an input circuit and an output circuit and responsive to voltage variations caused by dial pulses in said input circuit, pulse registering means in said output circuit, a second vacuum tube having an input circuit and an output circuit, circuits for causing said second tube to act as a multivibrator, a normally charged condenser connecting the output circuit of said first tube with the input circuit of said second tube, said condenser discharged by the response of said first tube to an incoming pulse, the output circuit of said second tube responsive to the discharge of said condenser to prevent the operation of said pulse registering means for a predetermined interval, means under the control of said pulse registering means to recharge said condenser, and a circuit including an asymmetric conducting device effective to recharge said condenser if said incoming pulse terminates prior to the end of said predetermined interval.

8. In a dial pulse receiving arrangement, a pulsing circuit including a variable source of voltage and pulsing means for alternating the effective voltage between a minimum and a maximum value, a vacuum tube having an input circuit and an output circuit, means to connect said input circuit with said pulsing circuit to render said vacuum tube responsive to said voltage alternations, pulse registering means in said output circuit, a non-grounded bias voltage for said vacuum tube and means for varying said bias voltage in accordance with the value of said voltage source, comprising a source of alternating current, a transformer having a primary winding and duplicate secondary windings, means to connect said alternating-current source to the primary winding of said transformer, duplicate rectifiers, each having an input circuit and an output circuit, the input circuits of said rectifiers being connected to said secondary windings, means to connect said voltage source to the output of one of said rectifiers, means to control the current flow in said primary winding in accordance with the value of said voltage source as superimposed on the output of said one rectifier, and means to connect the output of the other one of said rectifiers to the input circuit of said vacuum tube.

FRANK E. BLOUNT.

REFERENCES CITED

The following references are of record in the file of this patent:

UNITED STATES PATENTS

| Number | Name | Date |
|---|---|---|
| 2,308,778 | Prince | Jan. 19, 1943 |
| 2,319,333 | Logan | May 18, 1943 |
| 2,338,218 | Vroom | Jan. 4, 1944 |
| 2,360,989 | Van Damme | Oct. 24, 1944 |
| 2,411,648 | Braver | Nov. 26, 1946 |
| 2,416,102 | Kessler | Feb. 18, 1947 |
| 2,457,892 | Hibbard | Jan. 4, 1949 |